US008209760B1

(12) United States Patent
Hardman (10) Patent No.: US 8,209,760 B1
(45) Date of Patent: Jun. 26, 2012

(54) QUANTIFYING A PROPERTY OF A FOCUS COMPUTING RESOURCE BASED ON PROXIMITY TO OTHER COMPUTING RESOURCES

(75) Inventor: Daniel H. Hardman, American Fork, UT (US)

(73) Assignee: Symantec Corporation, Mountain View, CA (US)

( * ) Notice: Subject to any disclaimer, the term of this patent is extended or adjusted under 35 U.S.C. 154(b) by 1179 days.

(21) Appl. No.: 11/769,122

(22) Filed: Jun. 27, 2007

(51) Int. Cl.
G06F 21/00 (2006.01)
(52) U.S. Cl. ........................................................ 726/25
(58) Field of Classification Search ................ 726/25, 726/22
See application file for complete search history.

(56) References Cited

U.S. PATENT DOCUMENTS

| | | | |
|---|---|---|---|
| 7,013,395 B1* | 3/2006 | Swiler et al. | 726/25 |
| 7,890,869 B1* | 2/2011 | Mayer et al. | 715/736 |
| 2004/0143753 A1* | 7/2004 | Hernacki et al. | 713/200 |
| 2005/0193430 A1* | 9/2005 | Cohen et al. | 726/25 |
| 2006/0021048 A1* | 1/2006 | Cook et al. | 726/25 |
| 2006/0123464 A1* | 6/2006 | Goodman et al. | 726/2 |
| 2007/0016955 A1* | 1/2007 | Goldberg et al. | 726/25 |
| 2007/0067847 A1* | 3/2007 | Wiemer et al. | 726/25 |
| 2007/0121843 A1* | 5/2007 | Atazky et al. | 379/114.13 |
| 2008/0097863 A1* | 4/2008 | Spiegelman | 705/26 |
| 2008/0229420 A1* | 9/2008 | Jeschke et al. | 726/25 |

* cited by examiner

Primary Examiner — David Pearson
(74) Attorney, Agent, or Firm — Advantedge Law Group (57) ABSTRACT

The estimation of a risk factor applied to a negative potential of a focus computing resource based on proximity of the focus computing resource from other computing resources, and not just based on neighboring distance-1 computing resources. Upon determining that the risk factor applied to a negative potential of a focus computing resource is to be estimated, the negative potentials for one or more distance-1 computing resources are accessed. These negative potentials may have, in turn, been estimated based on distance and risk factor propagation from yet other higher distance computing resources. The negative potentials for the distance-1 computing resources are then used to estimate the risk factor applied to the negative potential of the focus computing resource.

20 Claims, 4 Drawing Sheets

QUANTIFYING A PROPERTY OF A FOCUS COMPUTING RESOURCE BASED ON PROXIMITY TO OTHER COMPUTING RESOURCES

BACKGROUND OF THE INVENTION

Many computing resources take precautions when communicating with other computing resources. In the remainder of this background, the computing resource taking the precautions will be referred to as a "protected computing resource", whereas the computing resource that is subject to trust evaluations will be referred to as the "suspect computing resource". Accordingly, the protected computing resource will take precautions when communicating with a suspect computing resource.

One conventional mechanism for exercising such precautions is to maintain a list of trusted or untrusted computing resources. If a suspect computing resource is on the trusted list (or is not on the untrusted list), the protected computing resource is granted access to the suspect computing resource. Otherwise, access is not granted. There are a variety of mechanisms for determining which computing resources go on the list. For instance, the computing resource may evaluate malware signatures that are sent by the suspect computing resource. Some protected computing resources evaluate probabilistically the chance that a suspect computing environment will be harmful. Regardless of how the suspect computing resource is evaluated, if the suspect computing resource is determined to be harmful, the protected computing resource is "fenced off" from visiting the suspect computing resources.

The conventional approach, however, has some important limitations. The approach is mostly binary. For instance, either a program matches a malware signature, or it does not. Also, these approaches depend on the ability to peer into the suspect computing resource. For instance, the protected computing resource may not be able to accurately assess the safety of a suspect computing resource, where the state of the suspect computing resource's firewall, the currency of its signatures, and other status is unknown. Finally, the ability to assess safety is limited by the amount of direct evidence the protected computing resource can obtain about the suspect computing resource.

BRIEF SUMMARY

Embodiments described herein allow the estimation of a risk factor applied to a negative potential of a focus computing resource; in other words, they quantify an estimate of the likelihood that a computing resource will be harmed by interacting with another computing resource. This estimate is based on degree of graph node distance of the focus computing resource to other computing resources, and on the amount of negative potential embodied in each of those other computing resources. The estimate is not just based on distance-1 computing resources, but is also based on the computing resources having some distance from the distance-1 computing resources, and potentially so forth.

Upon determining that a risk factor to be applied to a negative potential of a focus computing resource is to be estimated, the negative potential(s) for one or more distance-1 computing resources are accessed. (Here, "distance" refers to the minimal number of connections between two nodes of a directed or undirected graph, where each node represents a computing system, and connections between nodes represent the ability of one of the computing resource represented by one of the nodes to alter the state of another computing resource represented by another of the nodes. A "distance-1" computing resource with respect to a focus computing resource thus means that the distance-1 computing resource has a minimum path of one to the focus computing resource, even though there may be other paths from the distance-1 computing resource to the focus computing resource that have more than one connection.

The negative potential(s) of these distance-1 resources may be directly known (e.g., a machine is a known carrier of a virus), or they may be estimated by calculating the risk factor of each distance-1 resource from its own distance-1 neighbors. The negative potential(s) for the distance-1 computing resources are then used to estimate the risk factor for the focus computing resource. Part of this estimate may involve a propagation factor in which the nature of the connectivity between computing resources is used to estimate how much of the negative potential associated with one computing resource might translate into risk for the other.

Additional embodiments will be set forth in the description that follows, and in part will be obvious from the description, or may be learned by the practice of the invention. The embodiments of the invention may be realized and obtained by means of the instruments and combinations particularly pointed out in the appended claims. These and other embodiments of the present invention will become more fully apparent from the following description and appended claims, or may be learned by the practice of the invention as set forth hereinafter.

BRIEF DESCRIPTION OF THE SEVERAL VIEWS OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to the estimation of a risk factor applied to a negative potential of a focus computing resource based on degree of graphical distance (the terms "distance", "distance-1", "distance-2" and so forth will be defined further below) of the focus computing resource to other computing resources, and not just based on distance-1 computing resources. Upon determining that a risk factor of a focus computing resource is to be estimated, the negative potential for one or more distance-1 computing resources are accessed. These negative potentials may have, in turn, been estimated based on proximity of the corresponding distance-1 computing resource to yet other higher distance computing resources, and so forth. The negative potentials for the neighboring computing resources are then propagated in the form of constituent risk factors to be used to estimate an overall risk factor to be applied to a negative potential measurement for the focus computing resource.

In this description and in the claims, a "computing resource" is defined broadly to include any computing system or device, any software program, or any software object, or any combination thereof.

A "computing system" is any physical hardware that includes memory and/or storage (collectively referred to hereinafter as "memory") capable of containing data and/or executable instructions, and at least one processor that is capable of reading data from and writing data to the memory, and executing computer-executable instructions contained in the memory. Examples of computing systems include desktop computers, servers, routers, laptops, Personal Digital Assistants (PDAs), telephones, and the like. Even systems that have not been conventionally thought of as containing computing systems now contain computing systems. Examples include watches, toys, video games, televisions, refrigerators, automobiles, and so forth. It is anticipated that computing systems may be incorporated into an even wider variety of physical forms in the future. Computing systems may be composed of constituent computing systems as is the case when the computing system is distributed across a network.

A "software program" is defined as any executable set of instructions that may be executed by a computing system to direct one or more functional aspects of the computing system. The software program may be a component of another program, and may be included within an operating system, outside of an operating system, or distributed therebetween. In a computing system that is distributed over a network, the software program might also be distributed across the network, although not required.

A "software object" is a component of program that contains computer-executable instructions and/or data. A software object may contain exclusively computer-executable instructions or may contain just data, but may also have a combination thereof. A computing resource may be, for example, an account associated with a particular user, or a music file, or any other software object.

Figure 1:
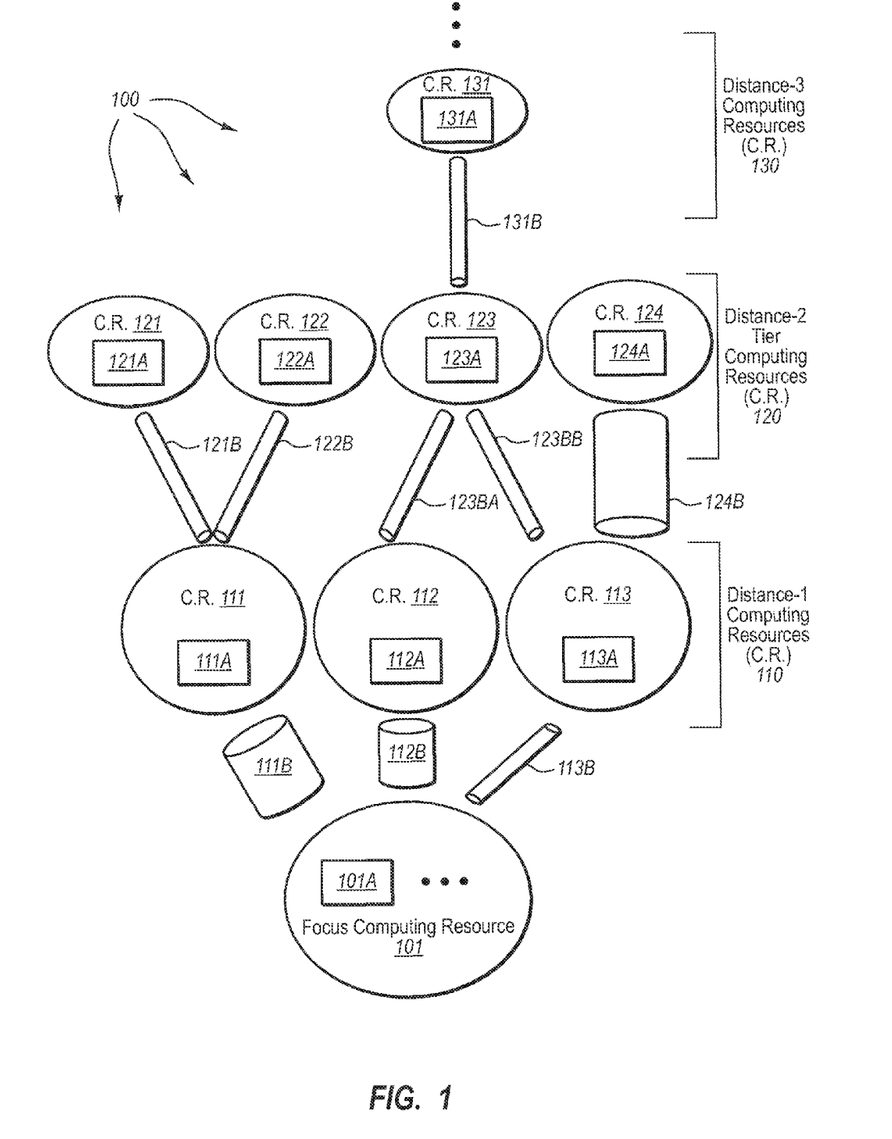
FIG. 1 illustrates an interdependency graph showing an example of how computing resources might be graphically interconnected, where each connection represents that the computing resource represented by one of the nodes on one side of the connection may have the capacity to alter the state of the computing resource represented by the other node on the other side of the connection.

FIG. 1 illustrates an example relational graph 100 of multiple computing resources. In the diagram, the computing resources themselves are symbolically represented as oval-shaped. In this example, the computing resources include a focus computing resource 101, distance-1 computing resources 110, distance-2 computing resources 120, distance-3 computing resource 130, and so forth as represented by the vertical ellipses 140. The principles of the present invention may apply to any relational graph of any eccentricity. For instance, if the relational graph represented the World Wide Web, there might be many degrees having thousands or even millions of computing resources. However, in the illustrated embodiment, the distance-1 computing resources 110 include three computing resources 111, 112 and 113; the distance-2 computing resources 120 include four computing resources 121, 122, 123 and 124; and the distance-3 computing resources 130 includes just one computing resource 131. In the drawings, the term "Computing Resource" is often abbreviated with the acronym "C.R."

Graph theory terminology may be applied to the structure of FIG. 1. In graph theory, there exists a set of nodes, and a set of connections between particular nodes. In FIG. 1, the computing resources 101, 111, 112, 113, 121, 122, 123, 124 and 131 each represent a node of a graph. In graph theory, these nodes may also be referred to as "vertices". Connections between particular nodes are also represented, and may represent some relationship between the two connected nodes. In this description, the connections represent that one computing system represented by one of the nodes in the connection may alter the state of the other computing system represented by the other node in the connection. In graph theory, these connections may also be referred to as "edges".

In a "directed" graph, each of these nodes is connected only in one direction. In an "undirected" graph, each of the connections is bi-directional. In a "mixed graph", the connections may be a mix of unidirectional and bi-directional. In a "weighted" graph, there is a weight associated with each edge in the graph. FIG. 1 will be described as a weighted directed graph for simplicity, in which the connections are represented by pipes, and the weights of the connection are represented by the thickness of the pipe. The graph is directed in this example since the relationships flow from the upper node to the lower node in each graphical connection. As will be described further with respect to FIG. 4, the principles of the present invention may apply to any weighted graphs of computing resource, whether directed, undirected, or mixed.

The "distance" between two nodes in a graph is defined as the minimum number of connections needed to travel from one node in the distance measure to the other node in the distance measure. For instance, computing resource 101 and computing resource 111 have a distance of one. The computing resource 112 and the computing resource 131 have a distance of two. Note that there may be paths between the two nodes that require more connections be traversed than the distance between the two nodes, since there may be multiple possible paths between two nodes in a graph. This distinction will become clearer when describing FIG. 4.

In this description and in the claims, a "distance-1" computing resource with respect to a reference computing resource means a computing resource that is a distance of 1 connection away from the reference computing resource. A "distance-2" computing resource with respect to a reference computing resource means a computing resource that is a distance of 2 connections away from the reference computing resource, and so forth for higher and higher distance computing resources. Unless otherwise specified, the reference computing resource when specifying a distance is the focus computing resource (e.g., focus computing resource 101).

Each computing resource in the graph 100 includes one or more negative potentials. For example, negative potential may quantify a particular harm associated with the computing resource. For instance, the harm might include potential for on-line solicitation, potential for obscene language, potential for viruses, potential for spam, potential for phishing attacks, potential for exposure to discriminatory language (based on race, gender, religion, national origin, sexual orientation), potential for exposure to violent content or activity, potential for exposure to sexually explicit content, the potential for on-line predatory activity, and other harmful potentials. The negative potential may also be a function of how up-to-date the security software is, whether the computing system is in a physically secure location, what kind of users interact with the computing resource, how often the password changes, etc.

In the illustrated embodiment, for clarity, each computing resource 101, 111-113, 121-124 and 131 is illustrated as containing a single negative potential identified symbolically by boxes 101A, 111A-113A, 121A-124A and 131A, respectively. However, there may be more negative potential in any of the computing resources as represented symbolically using the horizontal ellipses illustrated in the focus computing resource 101.

The computing resources of the relational graph 100 are "connected" in the sense that the negative potential of an upper computing resource may be used as an input to quantify a negative potential of a neighboring lower computing resource with a particular weighting. At least this would be the case if relational graph 100 were a weighted directed graph where the direction of the connection was unidirectional going downward. In the illustration of FIG. 1, related computing resource are symbolically shown as being interconnected by a pipe also called herein a "propagation path". The various propagation paths are illustrated with different thicknesses to symbolically represent that the weighting might be greater (for larger pipes) or lesser (for smaller pipes).

For instance, the negative potential 131A for the distance-3 computing resource 131 is used as an input to the quantification of the negative potential 123A of the distance-2 computing resource 123 with a propagation weighting factor 131B. In this description and in the claims, a negative potential is associated with each node in the graph 100. The functional combination of the negative potential and the propagation factor leading from that node to the next node will create a constituent risk factor that propagates to the next node to thereby be applied to determine an overall risk factor for that next node. Accordingly, in this description, when a negative potential for one computing resource is used "as an input to the quantification of the negative potential" of the next computing resource, an example of this behavior is that the negative potential for the node and the propagation factor are used as input in the form of a constituent risk factor to quantify a negative potential for the next node.

The negative potential 121A for the distance-2 computing resource 121 is used as a weighted input to the quantification of the negative potential 111A of the distance-1 computing resource 111 with a slightly heavier weighting factor 121B. The negative potential 122A for the distance-2 computing resource 122 is used as a weighted input to the quantification of the negative potential 111A of the distance-1 computing resource 111 with a propagation weighting factor 122B. The negative potential 123A for the distance-2 computing resource 123 is used as input to both the quantification of the negative potential 112A of the distance-1 computing resource 112 with a propagation weighting factor 123BA, and the quantification of the negative potential 113A of the distance-1 computing resource 113 with propagation weighting factor 123BB. Note that the same negative potential may thus be used to quantify negative potentials for multiple other computing resources, even if with different weightings.

Continuing the example, the negative potential 124A of the distance-2 computing resource 124 may be used as input to the quantification of the negative potential 113A of the distance computing resource 113A with a rather heavy propagation weighting factor 124B. The negative potential 111A of the distance-1 computing resource 111 may be used as input to quantify the negative potential 101A of the focus computing resource 101 with a rather heavy propagation weighting factor 111B. The negative potential 112A of the distance-1 computing resource 112 may be used as input to quantify the negative potential 101A of the focus computing resource 101 with a somewhat heavy propagation weighting factor 112B. Finally, the negative potential 113A of the distance neighboring computing resource 113 may be used as input to quantify the negative potential 101A of the focus computing resource 101 with a rather slight propagation weighting factor 113B.

Accordingly, the negative potential 101A of the focus computing resource 101 is not just a function of the negative potentials propagated from the distance-1 computing resources, but also a function of the negative potentials propagated through them from distance-2 computing resources. In the illustrated case, the negative potential 101A of the focus computing resources may also be at least partially inherited from distance-3 computing resources, and potentially so forth as represented by the vertical ellipses 140. Thus, the quantification of the negative potential 101A of the focus computing resource is a function of not just distance-1 computing resources, but based on a degree of graphical distance that extends beyond a degree of one.

In one embodiment, the relation between neighboring computing resources may be based on some level of physical connection between the computing resources. For example, one computing resources might be permanently physically connected to the neighboring computing resource to which a propagation path is formed. However, this is not at all required. The neighboring computing resources may be only sometimes connected. As an example, perhaps distance-2 computing resource 124 has a persistent connection with distance-1 computing resource 113, while distance-2 computing resource 123 is only sometimes connected to distance-1 computing resource 112.

The negative potential might be, for example, a risk factor such as susceptibility to spam, virus propagation, spyware, phishing, or others. Another risk factor might be content risk. For example, the computing resource may have a certain risk of disseminating content that some might consider objectionable such as, for example, violent content, sexually explicit content, objectionable language content, hate speech content, or others depending on sensitivity. A risk factor might also weight a risk of on-line predatory activity.

The negative potentials need not be homogenous, but may be heterogenic propagating one risk factor from one computing resource to another type of risk factor of another computing resource. For example, one computing resource's (e.g., computing resource's 131) susceptibility to spam (e.g., negative potential 131A) might be considered as an input to another computing resource's (e.g., computing resource's 123) negative potential (e.g., negative potential 123A) for phishing with a certain propagation factor. After all, phishing attaches often come in the form of spam. As another example, a computing resource's susceptibility to viruses may well affect a connected computing resource's susceptibility to spam, since viruses often take over computing resources to cause spam to be dispatched to yet other computing resources. One negative potential may be a superset of another negative potential. For instance, one computing resource's susceptibility to spam may be used as input to the quantification of a neighboring computing resource's generalized negative potential that is generalized to include a quantification of a large group of different risk types.

Additionally or in the alternative, the negative potentials may be homogenous. For instance, the computing resource's (e.g., computing resource's 131) susceptibility to phishing (e.g., negative potential 131A) might be considered as an input to the quantification of another computing resource's (e.g., computing resource's 123) negative potential (e.g., negative potential 123A) for phishing with another propagation factor. In FIG. 1, none, one, some, or all of the propagation paths may represent propagation weightings between homogenous properties (e.g., spam to spam, or virus to virus), while none, one, some or all of the propagation paths may represent propagation weightings between heterogenic properties (e.g., spam to phishing, or virus to spam).

The negative potential used as input through the propagation path perhaps to formulate a constituent risk factor may not even be a single negative potential, but a collection of two or more negative potential, although not required. For instance, the negative potential 121A of the distance-2 computing resource 121 may include constituent negative potentials including a negative potential representing susceptibility to viruses, a negative potential representing susceptibility of spam, and a negative potential representing susceptibility to phishing. Those negative potentials may all be used as input to the quantification of the negative potential 111A of the distance-1 computing resource using a single propagation path weighting 121B. Alternatively, two or more of even all of the constituent negative potential of the property 121A of the distance-2 computing resource 121 may have their own propagation path having different weighting factors. Accordingly, each illustrated propagation path may represent multiple propagation paths between the associated computing resources.

In the relational graph 100, one computing resource is shown coupled to another using propagation paths. As previously mentioned, such neighboring computing resources might at least occasional connect with each other. In this sense, "connect" is to be interpreted broadly to represent any configuration in which information may be communicated in at least one direction from one neighboring computing resource to the other neighboring computing resource such that the connection neighbor might alter the state of its connection neighbor. This definition holds regardless of whether or not there are none, one, some or many computing resources that intervene between the neighboring computing resources to communicate that information. This definition also holds even if the information is represented in different forms as the information is communicated from one neighboring computing resources to another. For instance, the data representing the information may be conveyed via different protocols and undergo one or more or even many format translations prior to arriving at the other neighboring computing resource, so long as at least some of the sent information is conveyed. For instance, the distance-1 computing resource 111 may be capable of communicating information to the focus computing resource 101 albeit via dozens of other computing resources that are not shown in FIG. 1, and which are not considered (or at least which have effects that are condensed into the single propagation path 111B) in the relational graph 100.

A single illustrated computing resource in FIG. 1 may even represent multiple constituent computing resources, that each fall within the definition of computing resource defined herein. In that case, the associated negative potential may be a single negative potential that describes a negative potential of the entire collection of computing resources, or a weighted averaging of negative potentials of the constituent computing resources. For instance, distance-1 computing resource 112 may potentially include thousands of constituent computing resources, although they are all treated in a consolidated manner as a single computing resource 112 in the relational graph 100 of FIG. 1.

While a computing resource might represent a physical computing system, recall that the definition of computing resource provided herein is quite broad. Some or even all of the computing resources illustrated in the relational graph 100 may actually be on a single physical computing resource. Thus, for example, the distance-1 computing resource 111 might be a different computing system that the focus computing resource 101. Similarly, the distance-1 computing resource 111 may be a computing resource that is located on the same or a different computing system as is the focus computing resource 101. The computing resources may also be heterogenic. For instance, the computing resource 112 might be a proxy server, the focus computing resource 101 might be a user account, and the computing resource 123 might be a database or perhaps a music file.

The relational graph 100 only illustrates one relational graph. There may, in fact, be many relational graphs that are used to calculate properties of a computing resource based on its relational proximity to other computing resources. Each graph may have a uniquely different structure. Even a single computing resource can occupy different positions in multiple relational graphs. For instance, although the computing resource 131 is illustrated as occupying a specific position in the third-tier in the relational graph 100 of FIG. 1, that computing resource 131 may occupy some other position of other relational graphs, and may even be the focus computing resource in one or more other relational graphs.

Referring once again to FIG. 1, relational graph 100 may also have multiple alternative propagation paths. For instance, following one propagation path, the negative potential 122A has influence on the negative potential 101A by being proportionately propagated as risk factors through the propagation path 122B and through the propagation path 111B. However, although not illustrated, there might be an alternative propagation path that leads straight from the computing resource 122 to the focus computing resource 101. As a further alternative, there might be a propagation path that leads from the collection of two computing resources 121 and 122 to the focus computing resource 101, in which perhaps both negative potentials 121A and 122A (or a weighted property representing a consolidation of the two) is used as input to quantify the negative potential 101A of the focus computing resource. While alternative propagation paths are not shown to avoid unnecessarily complicating FIG. 1, there may be numerous such alternative propagation paths. The choice of which alternative propagation path to take may be dependent on a variety of factors, but how the choice is made is not important to the broader principles of the present invention.

Figure 2:
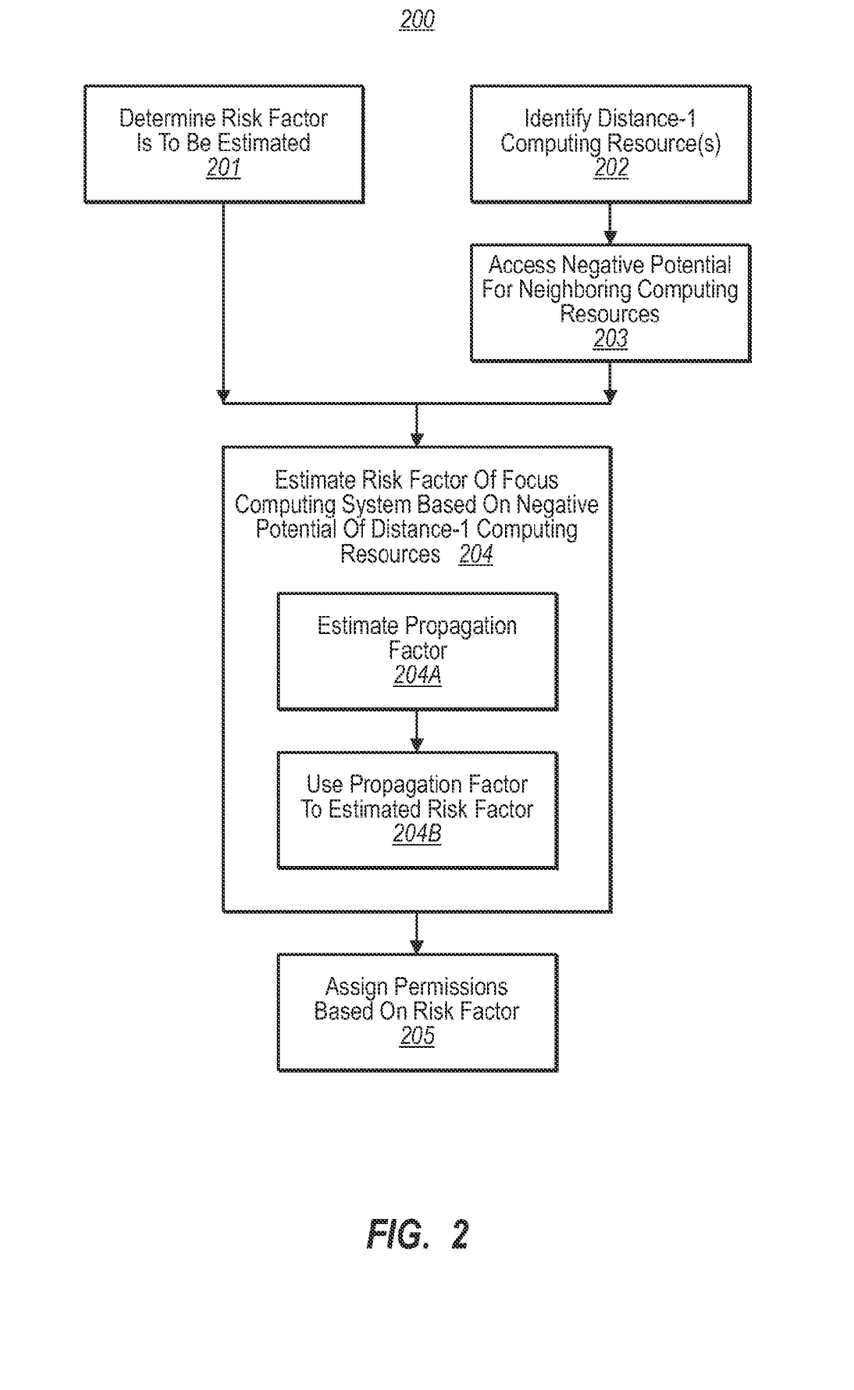
FIG. 2 illustrates a flowchart of a method for estimating a risk factor applied to a negative potential of a focus computing resource based on the focus computing resource's distance to and propagation of risk factors from other computing resources.

FIG. 2 illustrates a flowchart of a method 200 for quantifying a risk factor of a focus computing resource based from weighted graphical proximity to other computing resources. This method may be performed by a computing system such as the computing system 300 described further below with respect to FIG. 3. For instance, when implemented in software, the method 200 may be performed by a computing system accessing a computer program product that includes one or more computer-readable media. Such computer-readable media may have thereon computer-executable instructions that, when executed by one or more processors of the computing system, cause the computing system to perform the method 200. The method 200 may be performed on the same computing system as the focus computing resource having its risk factor being evaluated, although that is not required. The method 200 may also be performed on a different computing system than the computing system that has the focus computing resource.

In any case, the method 200 includes the determination that a risk factor applied to a negative potential of a focus computing resource is to be "estimated" (act 201). Referring to FIG. 1, for example, the negative potential 101A of the focus computing system 101 may represent the risk factor to be estimated. Examples of such risk factors include, as previously mentioned, susceptibility to viruses, spam, phishing, and other security risks. In addition, a risk factor may include content risks as previously mentioned. In this description and in the claims, the "estimation" of a risk factor includes the generation of a value that quantifies the risk associated with the risk factor. There is no requirement regarding the accuracy of the estimate. In fact, the estimate may be entirely incorrect although that is not the preferred embodiment. Furthermore, the risk factor may be a value that is not binary, but may take on three or more, and potentially numerous different values.

In addition to determining that the risk factor is to be estimated (act 201), the method 200 also identifies one or more distance-1 computing resources that have the capability to alter the state of the focus computing resource (act 202). Note that this identification (act 202) is shown in parallel with the determination act (act 201), which indicates that there is no requirement with respect to timing of the acts 201 and 202. The identification of distance-1 computing resources (act 202) may occur before, during, and/or after the determination that the risk factor is to be estimated (act 201). Referring to FIG. 1, the method 200 might identify that there are three distance-1 computing resources 111 through 113. Accordingly, the identification in this example identifies only distance-1 computing resources.

For one, some or all of the distance-1 computing resources identified in act 202, the method 200 then accesses an estimate of a negative potential for the associated distance-1 computing resource (act 203). The act 203 may also occur before, during, or after the act 201. In the case of FIG. 1, the method 200 may access the negative potential 111A of the computing resource 111, the negative potential 112A of the computing resource 112A, and the negative potential 113A of the computing resource 113. As previously explained, the negative potentials 111A through 113A may represent risk factors for the respective computing resources 111 through 113, respectively. For instance, if the method 200 were performed in the same computing system as is the focus computing resource, and the associated distance-1 computing resource were running on the same computing system, the estimated risk factor may be locally obtained. On the other hand, if the method 200 were performed on the same computing system as the focus computing resource, and the associated distance-1 computing resource were running on a different computing system, the method 200 may query the distance-1 computing resource for its associated estimated risk factor.

Alternatively or in addition, the computing system having the distance-1 computing resource may periodically report its estimated negative potential to the computing system having the focus computing resource. As yet another alternatively, there might be one or more central risk factor reporting databases that the focus computing resource may query to obtain the estimated negative potentials for the distance-1 computing resources. To support such a database, the focus computing resource might likewise report to the database its own negative potential after it estimates its own risk factor.

Importantly, note that the negative potentials of the distance-1 computing resources may have been obtained by performing the method 200 to estimate the negative potential of the focus computing system. Accordingly, the estimate of the negative potential for each of the first-tier computing resources 110 may be estimated based at least upon the weighted negative potentials for one or more distance-2 computing resources, and so forth and so on for higher-distance computing resources.

The method 200 then estimates the risk factor for the focus computing resource at least using the estimated negative potential for the identified distance-1 computing resources (act 204). One way to do this is to estimate a propagation factor associated with the negative potential. While the negative potential is a property of a node (i.e., a computer resource) in the graph 100, the propagation factor may be viewed as a property of the connection. Thus, there may be a propagation factor existing for the connection between any particular distance-1 computing resource and the focus computing resource (act 204A). For instance, in FIG. 1, the propagation factor between distance-1 computing resource 111 and the focus computing resource 101 is quite large, at least with respect to the negative potentials 111A and 101A. The focus computing resource 101 likewise has different propagation factors for distance-1 computing resources 112 and 113 as well. The propagation factor is then used to estimate the risk factor for the focus computing resource (act 204B).

For any given distance-1 computing resource, if there are neighboring distance-2 computing resources, the negative potential(s) for the distance-1 computing resource may have been obtained also performing the method 200. Accordingly, rather than the risk factor being a function of only the risk factors propagated from distance-1 computing resources, the risk factor may also be estimated based on an entire graphical proximity context of the focus computing resource within the graph, including distance-2 and higher distance computing resource(s), and so forth, as applicable. This may potentially lead to better estimates of negative potentials.

The method 200 for determining the negative potential may be performed using the same method or algorithm for each negative potential. For instance, negative potential 111A may be calculated using the method 200 and considering the distance-1 computing resource 111 to be in the focus position. The same may be said for the other negative potentials in the relational graph. By using a consistent algorithm at some, most, or even all computing resources, the result of the quantification of the negative potential 101A of the focus computing system 101 may be made deterministically. Even if the algorithms are not identical, but follow some predetermined standard, some level of consistency may be obtained.

The method 200 may optionally grant certain permissions depending on the estimated negative potential (act 305). For instance, rather than being a binary result, there might be three or more different permission scopes that may be granted depending on the estimated negative potential.

The negative potential may be updated as desired. In some cases, the negative potential may even be updated quite frequently as the situations giving rise to the negative potentials change. For instance, one computing resource may be unusually subjected to phishing attacks at a particular point in time, but may take remedial measures to address the problem. The reduced negative potential may then be communicated down the chain of the relational graph to thereby update all the risk factors in that chain. Updates may be occurring constantly in larger relational graphs.

In contrast with the prior art, the principles of the present invention do not just evaluate the negative potentials of a focus computing system based on immediate neighbors of the computing resource. Instead, a perhaps more accurate perception of risk may be obtained by estimating the negative potential in the context of a larger graphical neighborhood. In this context, negative potentials for the entire neighborhood of computing resources may be propagated towards the focus computing system with a diminishing scaling factor as dictated by the various propagation factors encountered as the relational graph is traversed down to the focus computing resource.

Referring to FIG. 1, suppose that the negative potential being evaluated was a susceptibility to a virus in which the behavior of a computing resource is subverted (hereinafter, "subversion risk"). Suppose further that the distance-1 computing resources 110 themselves shown little subversion risk, but were connected to distance-2 computing resources 120 that showed significant subversion risk, and a significant propagation factor to the distance-1 computing resource. The principles of the present invention would consider not just the subversion risk associated with the distance-1 computing resources, but would also consider the subversion risk associated with the distance-2 computing resource. Accordingly, the focus computing resource might be judged to have a higher level of risk as compared to just evaluating the immediately neighbors of the focus computing system 101.

The principles of the present invention may be very broadly applied. It would be a practical infeasibility to provide an exhaustive listing and description of how the invention may be applied for every possible application. Nevertheless, in an attempt to show how wide ranging the principles of the present invention are, four very different embodiments of the present invention will now be described, each with respect to the relational graph 100 of FIG. 1, although the embodiments may apply to any relational graph.

In a first example embodiment, the focus computing resource 101 may be a web page (hereinafter called a "focus web page"), and the negative potential 101A subject to quantization may be, for example, susceptibility to phishing. In that case, the distance-1 computing resource may be web pages (hereinafter called "distance-1 web pages") that may be navigated to upon selecting the hypertext links. The distance-1 web pages are validly "connected" to the focus web page since the web pages might alter the state of the focus web page.

The distance-1 web pages may, in turn, reference some hypertext links that are associated with executable files, and some hypertext links that are associated with other web pages (hereinafter, "distance-2 web pages"). The executable files may each have a phishing risk factor already associated with them. The distance-2 web pages may have a risk factor quantified based on their proximity to other computing resources and the associated propagation factors leading to the associated distance-2 computing systems.

The distance-1 web pages may each inherit propagated portions of risk factors for the connected distance-2 web pages and distance-2 executable files depending on the associated propagation factors. The focus web page may then inherit propagated portions of the connected distance-1 web pages' risk for viral attacks.

In this case, the propagation factors may be dependent upon any desired variable. For instance, perhaps the more a particular hyperlink occurs in the web page, the greater the propagation factor. For instance, if a hyperlink occurs five times in the focus web site, the propagation risk may be greater than if the hyperlink had just occurred once.

As a second example embodiment, the focus computing resource may be the personal web site (hereinafter, "focus personal web site") of a social networking site. For instance, the MySpace dot com web site has become quite popular, though other web sites also exist or may come into existence. That focus personal site may have links to other personal web sites also belonging to the social networking site. Now suppose that the risk factor being evaluated is content-based and is being evaluated for risk associated with explicit language. The risk factor for the focus web site may be dependent on the occurrence of explicit language in the web site itself In addition, a portion of the negative potential may be derived from higher-distance computing resources. For instance, suppose that the focus personal web site has a listing of songs. Each of those songs might be a separate distance-1 computing resource. Each song may have a particular language rating from which the content rating for those distance-1 songs may be quantified. The propagation factor for each song leading to the focus web site might be dependent on a variety of factors such as, for example, how long the song is, how often the song's hyperlink appears on the focus web site, how prominently that hyperlink is displayed, how explicit the language is in the song, the songs artist, and so forth.

In addition to connecting to the distance-1 songs, the focus web site also connects to other individual's personal web sites with that social networking site. Each of those other web sites might also have a risk factor associated with explicit lyrics or language. Those negative potentials might also have been quantified at least based in part upon distance-2 songs, stories, messages, or distance-2 web sites to which those distance-1 web sets are relationally connected.

As a third example, each of the computing resources in the relational graph may be a local area network (LAN) node. The risk factor might be, for example, vulnerability to a denial of service attack. Each LAN node may have an associated risk factor, in which the propagation factor may depend on the security imposed by the corresponding LAN node, whether it performs viral screening, and quality of the viral screening, the persistence of the connection to that LAN node, and so forth.

As a fourth example, an Internet Service Provider may be considered to be a focus computing resource, with each subscriber account being a distance-1 computing resource. Each distance-1 computing resource might have an associated spam risk factor. If many of the subscribers have a higher spam risk factor, the focus Internet Service Provider might have a higher spam rating. The distance-1 subscriber accounts may each have obtained their spam rating by being connected to yet other higher-distance computing resources.

Having described four general applications, it should be noted that these examples are provided only by way of illustrating a small sampling of the broader principles of the present invention. There are enumerable applications for the broader principles of the present invention.

Figure 4:
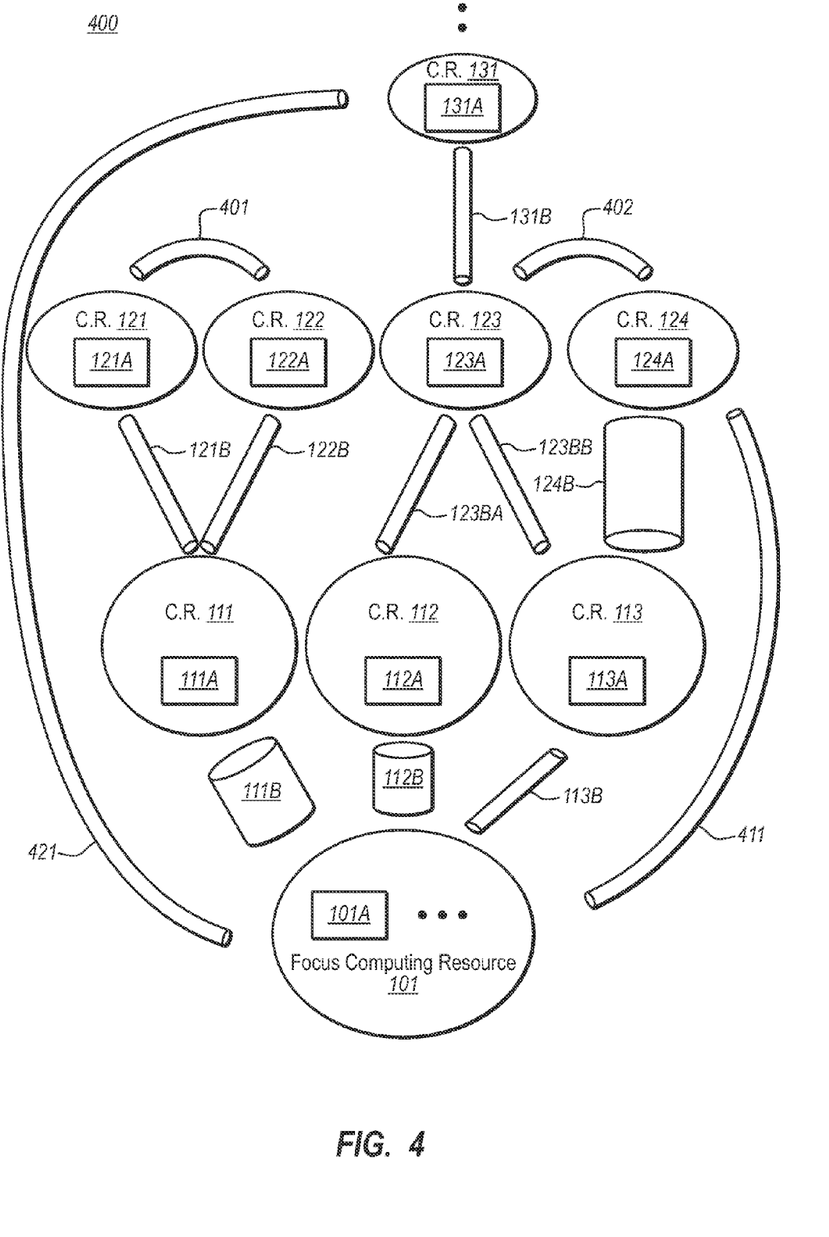
FIG. 4 illustrates an interdependency graph that builds upon the example interdependency graph of FIG. 1, to add further interdependencies.

FIG. 4 illustrates a graph 400 that builds upon the example graph 100 of FIG. 1, by adding several additional connections. In this embodiment, the graph is less hierarchical. For instance, in the graph 100 of FIG. 1, each connection is between a child and parent in a hierarchically structured graph. However, in the graph 400 of FIG. 4, while there are still connections between parent and child in what might be perceived to be the original hierarchical structure, there are now connections between sibling computing resources having the same distance to the focus computing resource 101. For instance, distance-2 computing resources 121 and 122 are connected by propagation factor 401. Additionally, distance-2 computing resources 123 and 124 are connected by propagation factor 402.

Additionally, connections may effectively skip generations. For instance, distance-2 computing resource 124 is connected directly to the focus computing resource via propagation factor 411. Also, distance-3 computing resource 131 is connected directly to the focus computing resource via propagation path 421. Note that this "direct" connection does not imply anything physical about the connection, but only implies that there is one edge between the nodes graphically representing the computing resources that are connected.

The graph 400 may be undirected, or mixed in that any of the connections between computing resources may propagate risk factors in either direction (albeit with perhaps different propagation factors depending on the direction of propagation). In that case, it may be helpful to have limiting algorithms that limit the propagation to a certain extent, thereby preventing unintended consequences due to propagation looping.

As previously mentioned, a computing resource is quite broadly defined. If the computing resource were a computing system, the computing system might be structured as described below for the computing system 300 of FIG. 3, although that computing system might take any form. The computing resource may also be software and/or data present on a computing system. Accordingly, to further enable the principles of the present invention, an example computing system will be described with respect to FIG. 3.

Figure 3:
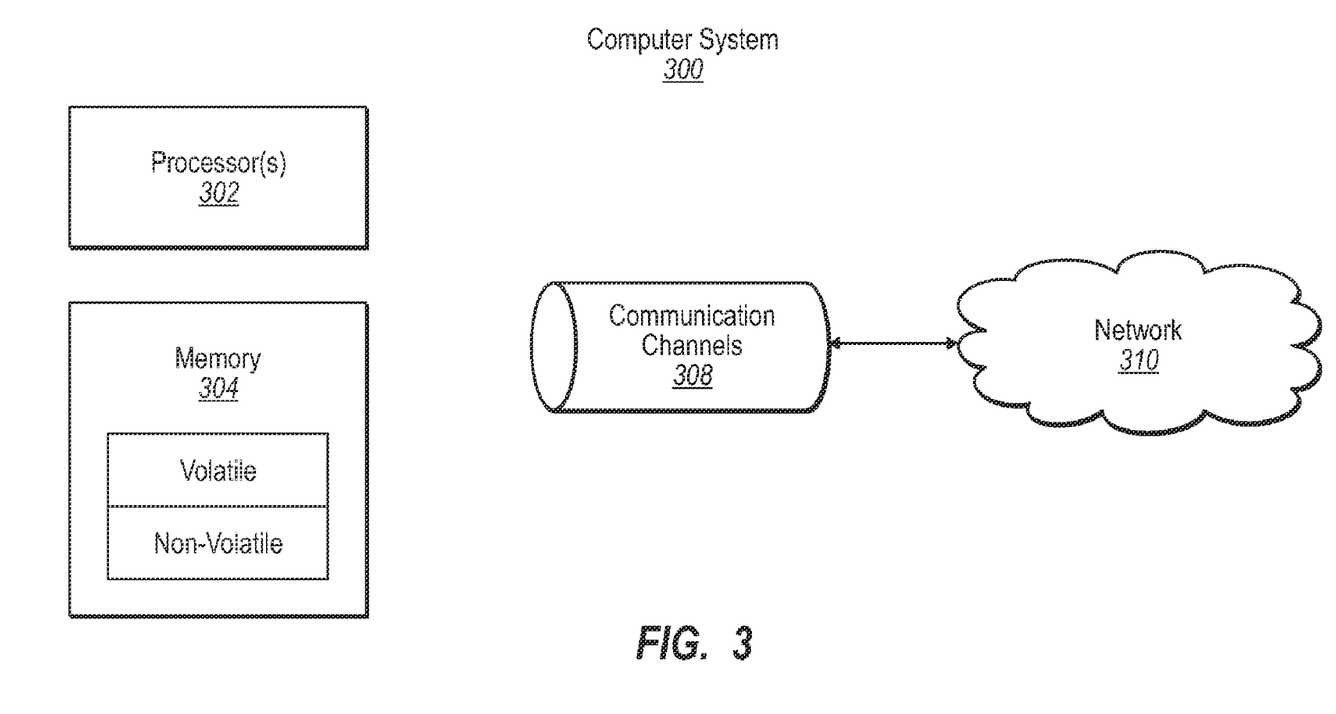
FIG. 3 illustrates a computing system in which at least components of the principles of the present invention may be employed.

FIG. 3 shows a schematic diagram of an example computing system that may be used to implement features of the present invention. The described computing system is only one example of such a suitable computing system and is not intended to suggest any limitation as to the scope of use or functionality of the invention. Neither should the invention be interpreted as having any dependency or requirement relating to anyone or combination of components illustrated in FIG. 3.

Computing systems are now increasingly taking a wide-variety of forms. Computing systems may, for example, be handheld devices, appliances, laptop computers, desktop computers, mainframes, or distributed computing systems. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 3, in its most basic configuration, a computing system 100 typically includes at least one processing unit 302 and memory 304. The memory 304 may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage. Such storage may be removable or non-removable, and may include (but not limited to) PCM-CIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware or hardware are also possible and contemplated. Thus, the terms "module" or "component" may apply to hardware or combinations of hardware and software that are implemented on a computing system.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 300 may also contain communication channels 308 that allow the computing system 300 to communicate with other computing systems over, for example, network 310. Communication channels 308 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method for estimating a risk factor associated with a focus computing resource, the method comprising:
   determining, by a computing system, that a risk factor applied to a negative potential of a focus computing resource is to be estimated;
   identifying one or more distance-1 computing resources that have the capability to alter a state of the focus computing resource;
   for at least a first distance-1 computing resource of the one of the one or more distance-1 computing resources, accessing a negative potential for the first distance-1 computing resource, wherein the negative potential is estimated based at least upon a risk factor for one or more distance-2 computing resources, the one or more distance-2 computing resources being distance-2 computing resources to the focus computing resource, but being distance-1 computing resources to the first distance-1 computing resource; and
   estimating the risk factor applied to the negative potential of the focus computing resource at least using the negative potential for the first distance-1 computing resource at least in part by:
   using the negative potential for the first distance-1 computing resource as a weighted input, based on a first propagation weight factor, to quantify the negative potential of the focus computing resource;
   using the negative potential for at least one of the one or more distance-2 computing resources as a weighted input, based on a second propagation weight factor, to quantify the negative potential of the first distance-1 computing resource, wherein:
   the first and second propagation weight factors are properties of respective connections between computing resources such that each propagation weight factor modifies a negative potential based on the negative potential being propagated along the respective connection in proportion to the propagation weight factor.

2. The method in accordance with claim 1, wherein the method is performed on the focus computing resource.

3. The method in accordance with claim 1, wherein the method is performed on a computing resource other than the focus computing resource.

4. The method in accordance with claim 1, wherein estimating the risk factor applied to the negative potential of the focus computing resource comprises estimating the risk factor applied to the negative potential of the focus computing resource based on the degree of graph node distance of the focus computing resource to other computing resources.

5. The method in accordance with claim 4, wherein a higher degree of graph node distance between a computing resource and the focus computing resource diminishes, without eliminating, the influence of the computing resource on the estimating of the risk factor applied to the negative potential of the focus computing resource.

6. The method in accordance with claim 1, wherein the nature of the connection between the focus computing resource and the distance-1 computing resource is used to determine the first propagation weight factor.

7. The method in accordance with claim 1, wherein the focus computing resource is an account.

8. The method in accordance with claim 1, wherein the risk factor comprises at least one of:
a risk of computer viruses; and
a risk of spyware.

9. The method in accordance with claim 1, wherein the risk factor comprises a content risk indicating a risk of media that is inappropriate for children.

10. The method in accordance with claim 1, wherein the first distance-1 computing resource is on the same computing system as the focus computing resource.

11. The method in accordance with claim 1, wherein the first distance-1 computing resource is on a different computing system than the focus computing resource.

12. The method in accordance with claim 1, wherein:
the focus computing resource comprises a focus web page;
the negative potential for the focus web page comprises susceptibility to phishing;
the first distance-1 computing resource comprises at least one distance-1 web page.

13. The method in accordance with claim 12, wherein:
the at least one distance-1 web page references hypertext links;
each of the hypertext links is associated with at least one of a distance-2 web page and an executable file.

14. The method in accordance with claim 13, wherein the first propagation weight factor is proportional to a number of occurrences of a hyperlink to the distance-1 web page in the focus web page.

15. The method in accordance with claim 1, wherein:
the focus computing resource comprises a focus personal website of a social networking site;
the risk factor is content-based and is evaluated for risk associated with explicit language;
the first distance-1 computing resource comprises a song included in a listing of songs within the focus personal website.

16. The method in accordance with claim 15, wherein:
the first propagation weight factor is dependent on at least one of:
how often a hyperlink for the song appears on the focus personal website;
how prominently the song's hyperlink is displayed.

17. The method in accordance with claim 1, wherein
the focus computing resource comprises an Internet Service Provider;
the first distance-1 computing resource comprises a subscriber to the Internet Service Provider.

18. The method in accordance with claim 1, wherein negative potentials propagate toward the focus computing resource with a diminishing scaling factor as dictated by the first and second propagation weight factors as a relational graph is traversed down to the focus computing resource.

19. A method for estimating a risk factor associated with a focus computing resource, the method comprising:
determining, by a computing system, that a risk factor applied to a negative potential of a focus computing resource is to be estimated;
identifying one or more distance-1 computing resources that have the capability to alter a state of the focus computing resource;
for at least a first distance-1 computing resource of the one or more distance-1 computing resources, accessing a negative potential for the first distance-1 computing resource, wherein the negative potential is estimated based at least upon a risk factor for one or more distance-2 computing resources, the one or more distance-2 computing resources being distance-2 computing resources to the focus computing resource, but being distance-1 computing resources to the first distance-1 computing resource;
estimating the risk factor applied to the negative potential of the focus computing resource at least using the negative potential for the first distance-1 computing resource at least in part by:
using the negative potential for the first distance-1 computing resource as a weighted input, based on a first propagation weight factor, to quantify the negative potential of the focus computing resource;
using the negative potential for at least one of the one or more distance-2 computing resources as a weighted input, based on a second propagation weight factor, to quantify the negative potential of the first distance-1 computing resource, wherein:
the first and second propagation weight factors are properties of respective connections between computing resources such that each propagation weight factor modifies a negative potential based on the negative potential being propagated along the respective connection in proportion to the propagation weight factor; and
granting permissions depending on the estimated risk factor.

20. A computer program product comprising one or more non-transitory computer-readable storage media having thereon computer-executable instructions that are structured such that, when executed by one or more processors of a computing system, cause the computing system to:
determine that a risk factor applied to a negative potential of a focus computing resource is to be estimated;
identify one or more distance-1 computing resources that have the capability to alter a state of the focus computing resource;
for at least a first distance-1 computing resource of the one or more distance-1 computing resources, access a negative potential for the first distance-1 computing resource, wherein the negative potential is estimated based at least upon a risk factor for one or more distance-2 computing resources, the one or more distance-2 computing resources being distance-2 computing resources to the focus computing resource, but being distance-1 computing resources to the first distance-1 computing resource;
estimate the risk factor applied to the negative potential of the focus computing resource at least using the negative potential for the first distance-1 computing resource at least in part by:
  using the negative potential for the first distance-1 computing resource as a weighted input, based on a first propagation weight factor, to quantify the negative potential of the focus computing resource;
  using the negative potential for at least one of the one or more distance-2 computing resources as a weighted input, based on a second propagation weight factor, to quantify the negative potential of the first distance-1 computing resource, wherein:
  the first and second propagation weight factors are properties of respective connections between computing resources such that each propagation weight factor modifies a negative potential based on the negative potential being propagated along the respective connection in proportion to the propagation weight factor; and
grant permissions depending on the estimated risk factor.

\* \* \* \* \*